United States Patent
Dupont et al.

(10) Patent No.: US 9,182,560 B2
(45) Date of Patent: Nov. 10, 2015

(54) CURABLE POLYMERIC COMPOSITIONS FOR CABLE FILLING

(75) Inventors: Martine Jeanne Dupont, Brussels (BE); Duco Bodt, Amsterdam (NL)

(73) Assignee: KRATON POLYMERS U.S. LLC, Houston, TX (US)

( * ) Notice: Subject to any disclaimer, the term of this patent is extended or adjusted under 35 U.S.C. 154(b) by 302 days.

(21) Appl. No.: 13/985,689

(22) PCT Filed: Feb. 18, 2011

(86) PCT No.: PCT/US2011/025500
§ 371 (c)(1),
(2), (4) Date: Aug. 15, 2013

(87) PCT Pub. No.: WO2012/112163
PCT Pub. Date: Aug. 23, 2012

(65) Prior Publication Data
US 2013/0331479 A1    Dec. 12, 2013

(51) Int. Cl.
| | |
|---|---|
| C08F 2/46 | (2006.01) |
| C08G 61/04 | (2006.01) |
| G02B 6/44 | (2006.01) |
| C08F 287/00 | (2006.01) |
| C09J 151/00 | (2006.01) |
| C08L 51/00 | (2006.01) |

(52) U.S. Cl.
CPC ............ *G02B 6/4401* (2013.01); *C08F 287/00* (2013.01); *C08L 51/006* (2013.01); *C09J 151/006* (2013.01); *G02B 6/4483* (2013.01); G02B 6/4429 (2013.01)

(58) Field of Classification Search
CPC .. G02B 6/4401; G02B 6/4483; G02B 6/4429; C08F 287/00; C08F 222/10; C08L 51/006; C09J 151/006
USPC ............................ 522/183, 182, 178, 1; 520/1
See application file for complete search history.

(56) References Cited

U.S. PATENT DOCUMENTS

| | | |
|---|---|---|
| 3,231,635 A | 1/1966 | Holden et al. |
| 3,322,856 A | 5/1967 | Holden et al. |
| 3,595,942 A | 7/1971 | Merson |
| 3,700,633 A | 10/1972 | Wald et al. |
| 4,077,893 A | 3/1978 | Kiovsky |
| 4,219,627 A | 8/1980 | Halasa et al. |
| 4,234,676 A | 11/1980 | Hein et al. |
| 4,391,949 A | 7/1983 | St. Clair |
| 4,460,675 A | 7/1984 | Gruetzmacher et al. |
| 4,464,013 A | 8/1984 | Sabia |
| 4,870,117 A | 9/1989 | Levy |
| 4,894,315 A | 1/1990 | Feinberg et al. |
| 5,814,709 A | 9/1998 | De Boer et al. |
| 5,886,107 A | 3/1999 | De Boer et al. |
| 5,925,717 A | 7/1999 | De Boer et al. |
| 5,952,430 A | 9/1999 | Van Der Heijden et al. |
| 6,414,059 B1 | 7/2002 | Kobayashi et al. |
| 7,169,848 B2 | 1/2007 | Bening et al. |
| 2003/0095770 A1 | 5/2003 | Fewkes et al. |
| 2003/0114582 A1 | 6/2003 | Husemann et al. |
| 2004/0242721 A1* | 12/2004 | Muyldermans et al. ...... 522/109 |
| 2005/0234199 A1 | 10/2005 | Taniguchi et al. |
| 2006/0247380 A1 | 11/2006 | Sunkara et al. |
| 2007/0203258 A1 | 8/2007 | Sugimoto et al. |

FOREIGN PATENT DOCUMENTS

| | | |
|---|---|---|
| EP | 0413294 A3 | 2/1991 |
| EP | 0387671 B1 | 11/1993 |
| EP | 0636654 B1 | 1/1997 |
| EP | 0696761 B1 | 8/1998 |
| JP | 2000039542 A | 2/2000 |
| JP | 3515439 B2 | 4/2004 |
| JP | 3658860 B2 | 6/2005 |
| JP | 4121821 B2 | 7/2008 |
| JP | 52900472 B2 | 9/2013 |
| WO | 9422931 A1 | 10/1994 |

OTHER PUBLICATIONS

F.A. Bovey, High Resolution NMR of Macromolecules (Academic Press, New York and London, 1976), Ch. 6.
Grulke, Eric A., Solubility Parameter Values, Polymer Handbook, 3rd Ed., pp. VII/519-VII/559, (1989) John Wiley & Sons (ISBN 0-471-01244-7).
Encyclopedia of Polymer Science and Engineering, John Wiley & Sons (1988) vol. 2, pp. 143-157, vol. 11, pp. 1-21 and vol. 16, p. 26.
International Search Report, dated Apr. 7, 2011.

* cited by examiner

*Primary Examiner* — Ling Choi
*Assistant Examiner* — Jessica E Whiteley
(74) *Attorney, Agent, or Firm* — Novak Druce + Quigg, LLP; Michael A. Masse

(57) ABSTRACT

A curable polymeric composition is herein disclosed. According to one embodiment, a curable polymeric composition comprises a thermoplastic block copolymer containing at least two polymer blocks A separated by at least one polymer block B. Each polymer block A is primarily a poly (monovinyl aromatic hydrocarbon) block, and polymer block B includes hydrogenated conjugated didne. The solid curable polymeric composition further comprises a curable functional compound compatible with polymer block A. The solid curable polymeric composition optionally comprises an initiator, a plasticizer, an antioxidant; a tackifyer and an aromatic resin.

15 Claims, 1 Drawing Sheet

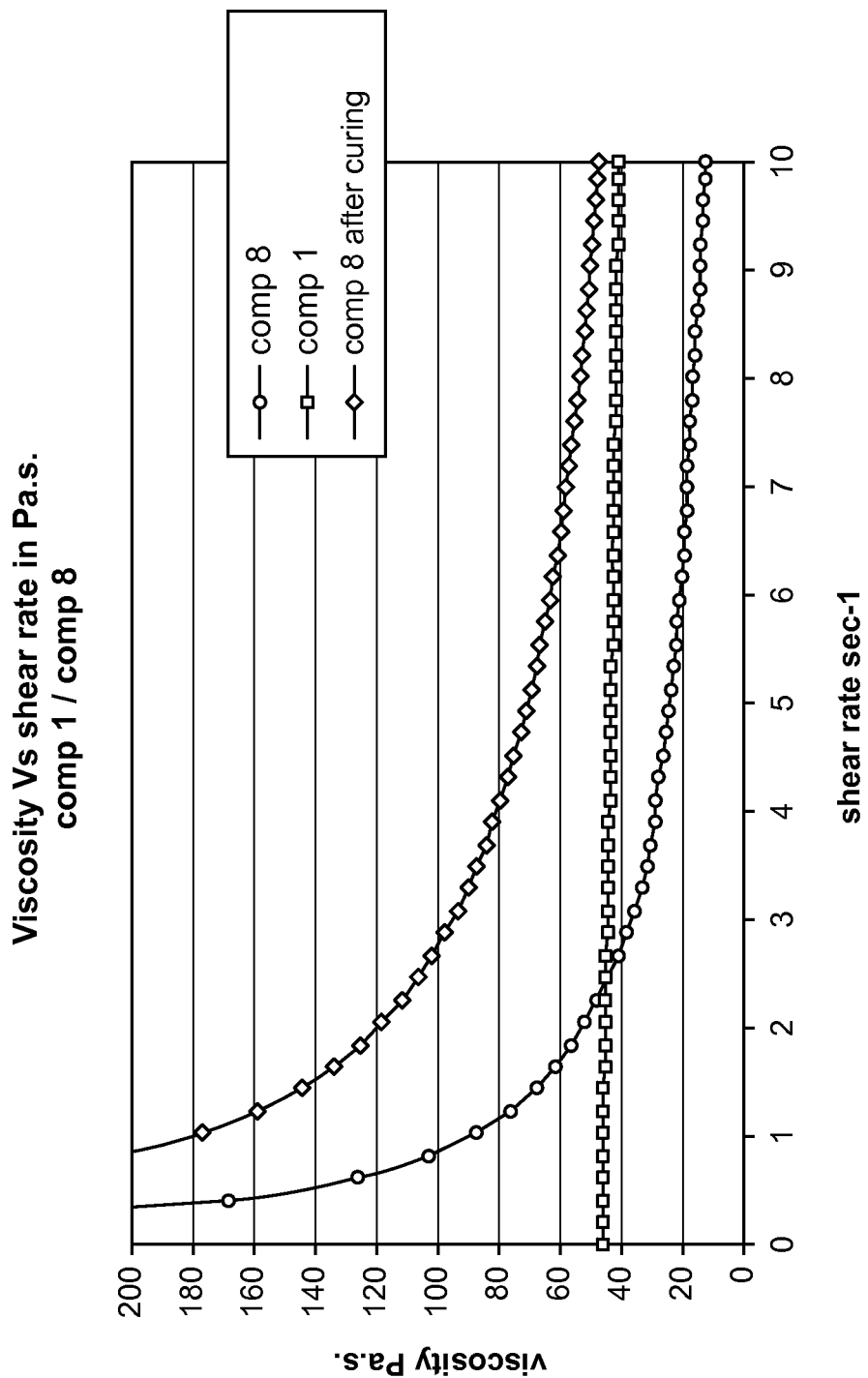

CURABLE POLYMERIC COMPOSITIONS FOR CABLE FILLING

FIELD OF THE INVENTION

The present disclosure is directed to curable polymeric compositions. In particular, the present disclosure is directed to a curable composition which is a fluid gel at room temperature and which is converted to a cohesive gel upon curing. Further, the curable composition can be employed with cables, fiber optic cables, as a sealant or with other applications.

BACKGROUND OF THE INVENTION

Thermoplastic elastomers are well known in the art and are available commercially. An important class of thermoplastic elastomers is styrenic block copolymers. These block copolymers are typically characterized by at least two polymer blocks of primarily polymerized monovinyl aromatic hydrocarbon monomers separated by at least one elastomeric polymer block, such as a polyolefin or (an optionally hydrogenated) polymer block of primarily polymerized conjugated diene monomers. Their behavior is explained on the basis of the so-called domain theory, wherein the poly(monovinyl aromatic hydrocarbon) polymer blocks cluster together and the elastomeric polymer blocks form a separate rubber phase that is the matrix.

Upon heating of a styrenic block copolymer above the glass-transition temperature of the poly(monovinyl aromatic hydrocarbon) blocks (about 95° C. in case of polystyrene), the viscosity and the elasticity of the block copolymer remains high compared to a homopolymer of the same molecular weight due to non-Newtonian behavior of the melt. This behavior is attributed to the persistence of a two-phase "domain" structure found in the melt below the so-called order-disorder transition temperature. In such a domain structure, flow can only take place by the poly(monovinyl aromatic hydrocarbon) polymer blocks of the block copolymer being pulled out of the domains.

Selectively hydrogenated block copolymers containing at least two mostly non hydrogenated poly(monovinyl aromatic hydrocarbon) blocks, e.g. polystyrene blocks, separated by at least one partially to completely hydrogenated conjugated diene block have very high and very non-Newtonian viscosities because of their extreme segmental incompatibility. Accordingly, processing is difficult and must take place under high shear conditions.

In many practical applications, the hydrogenated styrenic block copolymers are mixed with other ingredients being compatible with the rubber phase, compatible with the poly(monovinyl aromatic hydrocarbon) phase or simply being easily dispersed with the block copolymer system.

Styrenic block copolymers have also been used in the field of fiber optics. Fiber optic cables are an increasingly important technology in communications. The cables are made up of a core of optical fibers surrounded by a sheath that encompasses and protects them. A protective layer of material is provided between the inner and outer layers of the cable. Often a tape can be provided around the protective material along with some metallic or hard layer to contain the material. Moreover, the cable is usually encased in a plastic jacket for added protection and durability.

Traditionally, the layer of protective material around the fiber core has been made up of a composition composed of oil and styrenic block copolymers. Such a system has been used based on Kraton G polymers, for example as disclosed in U.S. Pat. No. 4,464,013. In these fiber optic systems where the fill material is based on styrenic block copolymers, a large portion of the composition is comprised of the hydrocarbon oil. This facilitates flow of the polymer composition and permits pumping of the material into the fiber optic cables during their formation.

A drawback however is that when the cables are cut, the grease or oil drips from the cables. Accordingly, when cutting or repairing the cables, this oil from the polymer composition must be cleaned off the fibers. Although efforts are made to improve the consistency of such compositions, they still tend to be greasy or oily. Accordingly, this can lead to difficulty when working on such cables as a residue may be left behind or make clean-up more problematic. Therefore, although such compositions are easy to pump in small diameter fiber optic cables, they are not user-friendly. Dry gels are much easier for operators to work with, however, they are difficult to pump or introduce into the fiber optic cables.

Therefore, what is needed is a composition that can be pumped into a fiber optic cable as a protective material in fiber optic cables, yet reduces or avoids the difficulties associated with oil leakage and cleanup.

SUMMARY OF THE INVENTION

The curable polymeric composition disclosed herein provides for a polymer composition that is a fluid gel at room temperature. Accordingly such gel is pumpable through small diameter cables. Additionally, the same polymer composition is curable to a cohesive gel. Such advantageous properties allow for the composition to be employable with cables, namely fiber optic cables, as they can be easily pumped through the cable as a fill material then cured within the cable to facilitate operator usage.

According to one embodiment, a curable polymeric composition comprises a thermoplastic block copolymer containing at least two polymer blocks A separated by at least one polymer block B. Each polymer block A is primarily a poly(monovinyl aromatic hydrocarbon) block, and polymer block B is a hydrocarbon block comprising a hydrogenated conjugated diene. The curable polymeric composition further comprises a curable functional compound compatible with polymer block A. The curable polymeric composition optionally comprises an initiator, a plasticizer, an antioxidant; a tackifyer and an aromatic resin.

The foregoing and other objects, features and advantages of the present disclosure will become more readily apparent from the following detailed description of exemplary embodiments as disclosed herein.

BRIEF DESCRIPTION OF THE DRAWINGS

Embodiments of the present application are described, by way of example only, with reference to the attached Figures, wherein:

FIG. 1 illustrates the viscosity as a function of shear rate of exemplary curable polymeric Composition 1 and comparative polymeric Composition 8.

DETAILED DESCRIPTION OF THE EMBODIMENTS

Numerous specific details are set forth in order to provide a thorough understanding of the example embodiments described herein. However, it will be understood by those of ordinary skill in the art that the example embodiments described herein may be practiced without these specific details. In other instances, methods, procedures and components have not been described in detail so as not to obscure the embodiments described herein.

Block Copolymer

Polymer block A is primarily a poly(monovinyl aromatic hydrocarbon) block. For the purposes of this invention "primarily" means in relation to polymer block A, that the polymer block A is composed of at least 75% by weight, preferably at least 90% by weight of monovinyl aromatic hydrocarbon. The remainder of the block is typically a polymerized olefinic monomer (which definition includes other vinyl compounds and dienes). More preferably, polymer block A is substantially composed of the same polymerized monomer, that is, more preferably, polymer block A is composed of at least 95% by weight of a monovinyl aromatic hydrocarbon. Most preferably, polymer block A is composed of 100% by weight of monovinyl aromatic hydrocarbon.

Preferably, the monovinyl aromatic hydrocarbon is chosen from the group of styrene, $C_1$-$C_4$ alkylstyrene and $C_1$-$C_4$ dialkylstyrene, in particular styrene, α-methylstyrene, o-methylstyrene or p-methylstyrene, 1,3-dimethylstyrene, p-tert-butylstyrene or mixtures thereof, more preferably styrene or a-methylstyrene, most preferably styrene.

Polymer block B is a saturated elastomeric hydrocarbon polymer block. It may be a polyolefin to which blocks A have been grafted. Preferably, polymer block B is based on a hydrogenated primarily poly(conjugated diene) block. For the purposes of this invention "primarily" means in relation to polymer block B that the polymer block B, before hydrogenation, is composed of at least 70% by weight, preferably at least 90% by weight of a conjugated diene. The remainder of the block is monovinyl aromatic hydrocarbon. More preferably, polymer block B is substantially composed of the same polymerized monomer, that is, more preferably, polymer block B, before hydrogenation is composed of at least 95% by weight of an conjugated diene. Most preferably, polymer block B is composed of 100% by weight of a hydrogenated poly(conjugated diene) block.

Preferably, the conjugated diene is chosen from conjugated dienes containing from 3 to 24 carbon atoms, more preferably from 3 to 8 carbon atoms, in particular butadiene and/or isoprene. If the conjugated diene is butadiene it is preferred to polymerize a substantial part of the butadiene via 1,2-addition rather than 1,4-addition. Preferably, the amount of butadiene that is polymerized via 1,2-addition is at least 25% of the total amount of polymerized butadiene. In other words, the so-called 1,2-vinyl content prior to hydrogenation is preferably at least 25%, more preferably in the range from 30 to 90%. According to preferred embodiments the saturated elastomeric hydrocarbon block is a copolymer of ethylene-butylene, ethylene-propylene or ethylene-butylene-propylene.

In other embodiments, the B block may be what is known as a "controlled distribution" block. These are disclosed for example in U.S. Pat. No. 7,169,848 which is herein incorporated by reference in its entirety.

For purposes hereof, "controlled distribution" is defined as referring to a molecular structure having the following attributes: (1) terminal regions adjacent to the poly(monovinyl aromatic hydrocarbon) ("A") blocks that are rich in (i.e., having a greater than average amount of) conjugated diene units; (2) one or more regions not adjacent to the A blocks that are rich in (i.e., having a greater than average amount of) mono alkenyl arene units; and (3) an overall structure having relatively low blockiness. For the purposes hereof, "rich in" is defined as greater than the average amount, preferably greater than 5% the average amount. This relatively low blockiness can be shown by either the presence of only a single glass transition temperature ("Tg,") intermediate between the Tg's of either monomer alone, when analyzed using differential scanning calorimetry ("DSC") thermal methods or via mechanical methods, or as shown via proton nuclear magnetic resonance ("H-NMR") methods. The potential for blockiness can also be inferred from measurement of the UV-visible absorbance in a wavelength range suitable for the detection of polystyryllithium end groups during the polymerization of the B block. A sharp and substantial increase in this value is indicative of a substantial increase in polystyryllithium chain ends. In this process, this will only occur if the conjugated diene concentration drops below the critical level to maintain controlled distribution polymerization. Any styrene monomer that is present at this point will add in a blocky fashion. The term "styrene blockiness", as measured by those skilled in the art using proton NMR, is defined to be the proportion of S units in the polymer having two S nearest neighbors on the polymer chain. The styrene blockiness is determined after using H-1 NMR to measure two experimental quantities as follows:

First, the total number of styrene units (i.e. arbitrary instrument units which cancel out when ratioed) is determined by integrating the total styrene aromatic signal in the H-1 NMR spectrum from 7.5 to 6.2 ppm and dividing this quantity by 5 to account for the 5 aromatic hydrogens on each styrene aromatic ring.

Second, the blocky styrene units are determined by integrating that portion of the aromatic signal in the H-1 NMR spectrum from the signal minimum between 6.88 and 6.80 to 6.2 ppm and dividing this quantity by 2 to account for the 2 ortho hydrogens on each blocky styrene aromatic ring. The assignment of this signal to the two ortho hydrogens on the rings of those styrene units which have two styrene nearest neighbors was reported in F. A. Bovey, High Resolution NMR of Macromolecules (Academic Press, New York and London, 1972), chapter 6.

The styrene blockiness is simply the percentage of blocky styrene to total styrene units: Blocky %=100 times (Blocky Styrene Units/Total Styrene Units)

The subject controlled distribution copolymer block has two distinct types of regions—conjugated diene rich regions on the end of the block and a mono alkenyl arene rich region near the middle or center of the block. What is desired is a mono alkenyl arene/conjugated diene controlled distribution copolymer block, wherein the proportion of mono alkenyl arene units increases gradually to a maximum near the middle or center of the block and then decreases gradually until the polymer block is fully polymerized. This structure is distinct and different from the tapered and/or random structures discussed in the prior art.

Accordingly, the controlled distribution block includes poly(monovinyl aromatic hydrocarbon) units described for the A block (styrene, etc.) as well as the conjugated dienes (butadiene, etc.) described above. For controlled distribution the weight percent of mono alkenyl arene in each B block is between about 10 weight percent and about 75 weight percent, preferably between about 25 weight percent and about 50 weight percent for selectively hydrogenated polymers.

In the selectively hydrogenated block copolymer to be used in the polymeric composition of the present invention, typically at least 80%, preferably at least 90%, more preferably at least 95%, in particular at least 99% of the diene double bonds in the poly(conjugated diene) block(s) are hydrogenated. The hydrogenation degree can be analyzed using the nuclear magnetic resonance (NMR) method. Preferably not more than 25% by weight, more preferably not more than 10%, in particular not more than 5% of any monovinyl aromatic hydrocarbon is hydrogenated.

The block copolymer, designated herein by component (i), typically has the structure A-B-A, A-B-A', A-B-A'-B', (A-B)nX or (A-B)pX(B'(-A')r)q, wherein X is the residue of a coupling agent, A' and B' are polymer blocks of the same or different molecular weight as polymer blocks A and B respectively and polymer blocks A' and B' are selected from the same group of chemical compounds as polymer blocks A and B respectively; n≥2; p≥1; r is 0 or 1; q≥1; and (r*q+p)≥2. Preferably, n≤100 and (p+q)≤100; more preferably n≤20 and (p+q)≤20; in particular n≤6 and (p+q)≤6. In some embodiments, wherein the block copolymer is radial, n will be greater than or equal to 3.

The polymer blocks A typically have a true molecular weight molecular of 9,000 g/mol or less, alternatively 8,500 g/mol or less, alternatively the blocks A have a true molecular weight in the range from 1,000 to 9,000 g/mol; preferably from 2,500 to 9,000 g/mol, alternatively from 3,000 to 8,000 g/mol, or alternatively from 4,500 to 7,500 g/mol. It will be understood that combinations of these ranges can also be employed.

The polymer blocks B typically have an apparent molecular weight in the range from 10,000 to 700,000 g/mol; alternatively from 30,000 to 500,000 g/mol, or alternatively from 35,000 to 450,000 g/mol, or alternatively from 50,000 to 400,000 g/mol, or alternatively from 75,000 to 350,000 g/mol. It will be understood that combinations of these ranges can also be employed.

The total block copolymer, designated herein by component (i), typically has an apparent molecular weight in the range from 16,000 to 1,000,000 g/mol; alternatively from 25,000 to 900,000 g/mol, alternatively from 50,000 to 800,000 g/mol, alternatively from 75,000 to 700,000 g/mol, alternatively from 100,000 to 600,000 g/mol, alternatively from 150,00 to 500,000 g/mol. If the block copolymer is linear, more preferably the apparent molecular weight is in the range from 30,000 to 300,000, alternatively from 35,000 to 250,000, alternatively from 50,000 to 200,000. It will be understood that combinations of these ranges can be employed. If the block copolymer is radial, more preferably the apparent molecular weight of each arm is in the range 10,000 to 100,000 and the total apparent molecular weight is in the range 35,000 to 700,000.

As used herein with regard to the block copolymers of the present invention, the term "molecular weights" refers to the true molecular weight or apparent molecular weight in g/mol of the polymer or block of the copolymer or terpolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecules eluting first. The chromatograph is calibrated using commercially available polystyrene molecular weight standards. So the styrene blocks molecular weights measured by this method are true molecular weight, whereas the molecular weight of other polymers measured using GPC so calibrated are styrene equivalent or apparent molecular weights. The styrene equivalent molecular weight may be converted to true molecular weight when the styrene content of the polymer and the vinyl content of the diene segments are known. The detector used is preferably a combination ultra violet and refractive index detector. The molecular weights expressed herein are measured at the peak of the GPC trace and are commonly referred to as "peak molecular weights."

The block copolymer (i) may be a blend of block copolymers and/or can contain various percents by weight of a diblock copolymer containing one polymer block A and one polymer block B. The preferred amount of diblock copolymer very much depends on the targeted end-use. Thus, if for instance it is desired to provide a tacky adhesive composition or a low elongation at break sealant, the desired amount of diblock copolymer may be rather high. Preferably, the diblock copolymer content, if any, is not more than 40% by weight, more preferably not more than 10% by weight, and still more preferably not more than 7%. As outlined before, the block copolymer (i) may be prepared by any method known in the art and is typically prepared by anionic polymerization. For example, the block copolymer may be prepared by anionic polymerization using the well-known full sequential polymerization method, optionally in combination with re-initiation, or the coupling method. Anionic polymerization of block copolymers is well known in the art and has e.g. been described in U.S. Pat. Nos. 3,595,942; 3,322,856; 3,231,635; 4,077,893; 4,219,627; and 4,391,949, and International and European patent application publication Nos. EP 0413294, EP 0387671, EP 0636654, and WO 94/22931, incorporated herein by reference.

To prepare a saturated hydrocarbon polymer block B via anionic polymerization, typically first a conjugated diene is polymerized and the olefinic unsaturation selectively hydrogenated using hydrogenation catalysts. Selective hydrogenation of conjugated dienes is also well known in the art and has e.g. been described in U.S. Pat. Nos. 3,595,942, 3,700,633, 5,925,717; 5,814,709; 5,886,107; and 5,952,430, incorporated herein by reference.

Techniques to enhance the vinyl content of the butadiene portion are well known and may involve the use of polar compounds such as ethers, amines and other Lewis bases and more in particular those selected from the group consisting of dialkylethers of glycols. Most preferred modifiers are selected from dialkyl ether of ethylene glycol containing the same or different terminal alkoxy groups and optionally bearing an alkyl substituent on the ethylene radical, such as monoglyme, diglyme, diethoxyethane, 1,2-diethoxy-propane, 1-ethoxy-2,2-tert-butoxyethane, of which 1,2-diethoxypropane is most preferred.

Curable Compound

A curable functional compound (I) can be used in combination with block copolymer (i). Curable functional compound (I) can be any compound that is at least partially compatible with polymer endblock A of block copolymer component (i) disclosed herein. The solubility parameter of the curable functional compound is typically close to the solubility parameter of polymer endblock A.

At room temperature the monomer acts as a solvent for the end block A. Accordingly, the polymeric composition loses its cohesion and becomes fluid. As a result it is easy to pump, compound or apply according to the end use application.

The solubility parameter is well known to those skilled in the art and has been described in 'Polymer Handbook' third edition (1989) edited by J. BRANDRUP and E. H. IMMERGUT, John Wiley & Sons (ISBN 0-471-01244-7), incorporated herein by reference. The book describes a group contribution method, which can be used to estimate the solubility parameter of chemical compounds based on the knowledge of their chemical structure and their density. Solubility parameters calculated using the group contribution method and using the measured densities listed in the same book are in $(MPa)^{1/2}$ $\{(cal/cm^3)^{1/2}\}$: amorphous polystyrene: 18.44 {9.02}; amorphous polyethylene: 16.89 {8.26}; amorphous polypropylene: 15.89 {7.77}; amorphous polybutene-1: 16.13 {7.89}, rubber polymers such as Ethylene/Butylene: 16.36 {8.0}.

Accordingly, the solubility parameter of the curable functional compound is within the range from 8.72 to 12 {(cal/cm3)$^{1/2}$}, preferably, in the range from 8.87 to 10.00 and alternatively from 8.87 to 9.5. It will be understood that combination of these ranges can also be employed. As the curable functional compound has such solubility in order to be compatible with the end block, in some embodiments the composition excludes curable functional compounds which are not compatible with the A block but are compatible with the B block.

The curable functional compound (I) is at least partially compatible and is preferably compatible with polymer endblock A. The radically polymerisable compound can suitably be any compound that satisfies the above criteria. The curable functional compound (I) may be at least one compound selected from the group consisting of styrene, divinyl benzene, α-methylstyrene, vinyl toluene, esters, alcohols, mono or multi acrylate and mono or multi methacrylates. Preferred are mono or multi functional acrylates with polar substituents.

The curable compound can be made up of monomers of aliphatic polyol acrylates or methacrylates. In preferred embodiments, the curable functional compound includes monomers having one or more, preferably two, acrylate or methacrylate groups. The aliphatic polyols have from 2 to 6 hydroxyl groups, with two in the preferred embodiment. Additionally, the aliphatic main chain can have from 2 to 20 carbons, and are preferably alkanes. These monomers form polymers having solubility parameters in the range discussed above. Examples of monomers having more than one acrylate or methacrylate group include: 1,4-butanediol diacrylate, 1,6-hexanediol diacrylate, 1,6-hexanediol dimethacrylate, 1,12-dodecanediol dimethacrylate, trimethylol propane triacrylate, and dipentaerythritol monohydroxy-pentaacrylate. In some embodiments, the curable functional compound will include hexanediol diacrylate, hexanediol dimethylacrylate and butanediol diacrylate.

The relative amounts of various compounds that make up a resulting polymer composition are selected to produce a compound that is curable, pumpable and flows at relatively low temperatures, namely temperatures equal to and lower than 60° C. prior to curing. The resulting composition including a block copolymer component (i) and a curable functional compound (I) herein disclosed is preferably liquid at room temperature prior to curing.

For applications where the composition will be pumped prior to cure, the composition should have a viscosity at 60° C. of below 26 Pa·s (shear rate 5 sec-1), alternatively below 15 Pa·s (shear rate 5 sec-1), alternatively below 10 Pa·s (shear rate 5 sec-1), alternatively below 5 Pa·s (shear rate 5 sec-1), alternatively below 2.5 Pa·s (shear rate 5 sec-1).

In an exemplary embodiment, the curable functional compound (I) is present in an amount such that the weight percentage thereof is in the range from 250 to 600 parts by weight relative to the total weight of polymer endblock A and all compounds compatible therewith. In other embodiments, the curable functional compound (I) is present in the amount of 15% or less of the total composition, alternatively less than 10%, alternatively less than 5%, alternatively less than 2.5%, depending on the size of the end block A.

The curable polymeric composition of the present invention can also comprise an initiator. The initiator can be at least partially compatible with the polymer end blocks A and/or the curable functional compound (I). Examples of suitable initiators include photo-initiators and thermal initiators, that is, radical initiators which decompose at a certain temperature to form radicals.

Initiator Compound

Examples of thermal radical initiators are peroxide compounds and azo compounds. Many of such compounds are well known in the art and available commercially. Specific compounds differ in the temperature at which they decompose to form radicals. It is important to know the half-life of the thermal radical initiator for determining its useful temperature range. Thus, e.g. the temperature at which the half-life t½ of benzoyl peroxide is one hour is 91° C. and the temperature at which the half-life is ten hours is 71° C. For t-butyl perbenzoate the temperature is 125° C. or 105° C. for t½ being 1 hour or 10 hours respectively. For 1,1'-azobis (cyclohexanecarbonitrile) the temperature is 105° C. or 88° C. for t½ being 1 hour or 10 hours respectively.

One or ordinary skill in the art is capable of selecting an appropriate thermal radical initiator, with the appropriate half-life at the right temperature. The thermal radical initiator is used at a temperature that is below the order-disorder transition temperature of the block copolymer in the overall polymeric composition.

Azo compounds and peroxy compounds have been discussed in detail in the Encyclopedia of Polymer Science and Engineering, John Wiley & Sons (1988), volume 2, pages 143-157 and volume 11, pages 1-21 respectively, incorporated herein by reference. It is expected that a particular useful group of thermal radical initiators are those initiators that are commonly used in the radical polymerization of styrene to manufacture polystyrene. Examples of commercially available compounds are (see also volume 16, page 26 of the above encyclopedia): 2,2'-azobis(isobutyronitri-le); 2,2'-azobis(2, 4-dimethylvaleronitrile); 1,1'-azobis-(cyclohexanecarbo-nitrile); benzoyl peroxide; t-butyl 2-methylperbenzoate; dicumyl peroxide; t-butyl cumyl peroxide; di-t-butylperoxide; 1,1-di(t-butyl-peroxy)-3,3,5-trimethylcyclohexane; dilauroyl peroxide; di(2-ethylhexyl)peroxydicarbonat-e; t-amyl peroctoate; t-butyl peracetate; t-butyl perbenzoate; 2,5-bis(benzoyl-peroxy)-2,5-dimethylhexane; di-t-butyl-diperoxyazelate; and 1,1-di(t-butylperoxy)cyclohexane.

In an exemplary embodiment, the radical initiator is a photo-initiator. Photo-initiators are known in the art and examples of suitable photo-initiators have been disclosed in European patent specification No. 0 696 761 and U.S. Pat. Nos. 4,894,315; 4,460,675 and 4,234,676. Typically, the photo-initiator is selected from optionally substituted polynuclear quinones, aromatic ketones, benzoin and benzoin ethers and 2,4,5-triarylimidazolyl dimers.

Photoinitiators can be selected from different classes: α-hydroxyketones and blends (ex Irgacure™ 2959 from BASF), α-amino-ketones (ex Irgacure 907), benzildimethylketal (Irgacure 651), BAPO (Bis-Acyl-Phosphine Oxide) and blends (Irgacure 819). They can also be selected from the group consisting of the following:

(1) A bezophenone of general formula (I)

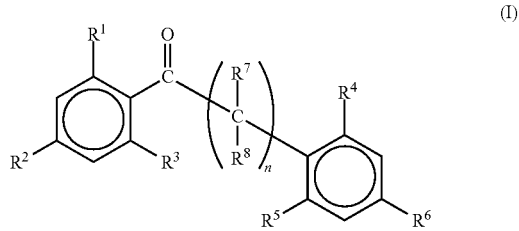

Wherein R$^6$ independently represent hydrogen or an alkyl group having from 1 to 4 carbon atoms, preferably methyl, and wherein R$^7$ and/or R$^8$ have the same meaning as R$^1$ to R$^6$ or represent in addition alkoxy or 1 to 4 carbon atoms and wherein n has a value of 0, 1, or 2, optionally in combination with at least one tertiary amine, (2) a sulphur-containing carbonyl compound, wherein the carbonyl group is directly bound to at least one aromatic ring and is preferably of the general formula (II)

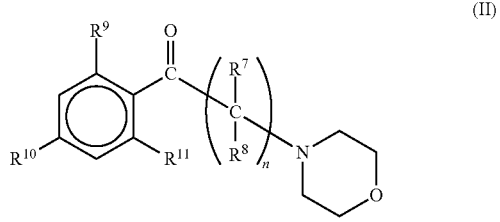

(II)

wherein $R^9$, $R^{10}$, and $R^{11}$ each may represent hydrogen, alkyl of 1 to 4 carbon atoms, or an alkylthio having 1 to 4 carbon atoms, and (3) mixtures of (1) and (2).

Suitable compounds of category (1) can include, but are not limited to benzophenone, 2,4,6-trimethylbenzophenone, 4-methylbenzo-phenone, and eutectic mixtures of 2,4,6-trimethylbenzo-phenone and 4-methylbenzophenone (ESACURE TZT), or 2,2-dimethoxy-1,2-diphenylethan-1-one (IRGACURE 651) (ESACURE and IRGACURE are trademarks). These compounds can be employed in combination with tertiary amines, such as e.g. UVECRYL 7100 (UVECRYL is a trademark). Category (2) embraces compounds such as, e.g., 2-methyl-1-[4-(methylthio)-phenyl]-2-morpholinopropanone-1, commercially available as IRGACURE 907. An example of suitable mixtures (category (3)) is a mixture of 15 percent by weight of a mixture of 2-isopropylthioxanthone and 4-iso-propylthioxanthone, and 85 percent by weight of a mixture of 2,4,6-trimethylbenzophenone and 4-methylbenzophenone. This mixture is commercially available under the trade name ESACURE X15. Photo-initiators of any one of the above categories (1), (2), and (3) can also be used in combination with other photo-initiators, such as e.g. UVECRYL P115 (a diamine). Particularly useful is a combination of benzophenone or IRGACURE 651 and said UVECRYL P115.

In an exemplary embodiment, the photo-initiator is selected from the group consisting of (i) benzophenone, or 2,2-dimethoxy-1,2-di-phenylethan-1-one (IRGACURE 651); (ii) a mixture of benzophenone or IRGACURE 651, and a tertiary amine; (iii) 2-methyl-1-[4-(methylthio)-phenyl]-2-morpholino-propanone-1; (iv) 2-methyl-1-[4-(methylthio) phenyl]-2-morpholinopropanone-1 or 2,2-dimethoxy-1,2-diphenyl-ethan-1-one; and (v) Irgacure 819 having the formula (Bis(2,4,6-trimethylbenzoyl)-phenylphosphineoxide) which can be activated by visible light.

In an exemplary embodiment, the photo-initiator is present in an amount from 0.1 to 20 parts by weight per 100 parts by weight of radically polymerisable compound, preferred range being 1 to 15 parts by weight per 100 parts by weight of radically polymerisable compound. Electron beam curing can be also used in which case initiators are not necessary.

The resulting curable polymeric composition including a block copolymer component (i) and a curable functional compound (I) as disclosed herein, can further comprise an aliphatic or cycloaliphatic diluent (processing aids, plasticisers, liquid resins), or a mixture of diluents, compatible with the midblock or endblock of block copolymer component (i).

Suitable aliphatic and cycloaliphatic plasticizer or extending oils (also referred to herein as "diluent") can include, but are not limited to the following: paraffinic process oils (e.g. CATENEX SM925); naphthenic oils; fully or highly hydrogenated process oils (e.g. ONDINA N68 or PRIMOL 352); waxes; liquid hydrogenated aromatic resins (e.g. REGALITE R1010); liquid polyalphaolefins (e.g. DURASYN 166); and liquid polymers such as hydrogenated polyisoprene, hydrogenated polybutadiene or polybutene-1 (CATENEX, ONDINA, PRIMOL, REGALITE and DURASYN are trademarks).

In an exemplary embodiment, the plasticizer and extending oils, if present, are present in an amount up to 1500 parts by weight per 100 parts by weight block copolymer, depending on the end-use application. In general, the amount of diluent can be in the range from 20 to 1200 parts by weight per 100 parts by weight of block copolymer. In end use applications such as fiber optic cables, the plasticizer and oils will comprise a large part of the composition from 100 parts by weight per 100 parts by weight block copolymer to 1500 parts by weight, alternatively, from 300 parts by weight per 100 parts by weight block copolymer to 1200 parts by weight block copolymer, further from 500 parts by weight per 100 parts by weight block copolymer to 100 parts by weight block copolymer.

In other embodiments, the hydrocarbon oils or plasticizers may be 50% or more of the composition by weight, 75% or more of the composition by weight, 85% or more of the composition by weight, 90% or more of the composition by weight, and still further 93% or more of the composition by weight, to 95% of the composition by weight. The amount of plasticizer will depend on the end use application. While such ranges are useful for compositions for use as fillers in cables, the amount of plasticizer will depend on the end use application. For example, sealants may be use less than 50% of a plasticizer.

Examples of the plasticizer suitable for use in the curable polymeric compositions herein disclosed include, but are not limited to white mineral oil, an oligomer of polyvinyl type such as polybutene, hydrogenated polybutene, hydrogenated α-olefin oligomer or atactic polypropylene; an aromatic oligomer such as biphenyl or triphenyl, and its complete or partial hydrogenation products; a hydrogenated polyene oligomer such as hydrogenated liquid polybutadiene; a paraffin such as paraffin oil or chlorinated paraffin; a cycloparaffin such as naphthene oil; a phthalic acid ester such as dibutyl phthalate, diheptyl phthalate, di(2-ethylhexyl)phthalate, butylbenzyl phthalate, di-n-octyl phthalate, diisononyl phthalate, diisodecyl phthalate or diundecyl phthalate; a non-aromatic dibasic acid ester such as di(2-ethylhexyl) adipate, di-n-octyl adipate, diisononyl adipate, diisodecyl adipate, di(2-ethylhexyl)sebacate or di-2-ethylhexyl tetrahydrophthalate; an aromatic ester such as tri-2-ethylhexyl trimellitate or triisodecyl trimellitate; a fatty acid ester such as butyl oleate, methyl acetylrecinolate or pentaerythritol ester; a polyalkylene glycol ester such as diethylene glycol benzoate or triethylene glycol dibenzoate; a phosphoric acid ester such as tricresyl phosphate or tributyl phosphate; an epoxy plasticizer such as epoxidated soybean oil or epoxidated linseed oil; an alkylsulphonic phenyl ester such as Mesamoll or Mesamoll II (trade mark, product of Bayer AG); and the like. These may be used alone or in admixture thereof.

The resulting curable polymeric composition can further comprise a tackifying resin, depending on the end use application. Tackifying resins are well known to those skilled in the art. A wide variety of different tackifying resins are available commercially. The tackifying resin are preferably partially or fully hydrogenated aliphatic hydrocarbon resins, hydrogenated rosin ester or partially or fully hydrogenated aromatic hydrocarbon resins. Tackifying resins would likely be used in applications other than filling cables (i.e. cables for fiber optics).

Suitable tackifying resins can include, but are not limited to the following: hydrogenated styrene-based resins such as REGALREZ resins designated as 1018, 1033, 1065, 1078, 1094 and 1126; REGALREZ 6108, a 60% hydrogenated aromatic resin; hydrogenated tackifying resins based on $C_5$ and/or $C_9$ hydrocarbon feedstocks such as ARKON P-70, P-90, P-100, P-125, P-115, M-90, M-100, M-110 and M-120 resins and REGALITE R-1090, R1100, R9100, resins; hydrogenated Polycyclopentadienes such as ESCOREZ 5320, 5300 and 5380 resins; hydrogenated polyterpene and other naturally occurring resins such as CLEARON P-105, P-115, P-125, M-105 and M-115 resins and EASOTACK H-100, H-115 and H-130 resins (REGALREZ, ARKON, ESCOREZ, CLEARON and EASOTACK are all trademarks).

The tackifying resin typically has a softening point as determined by the Ring and Ball method (ASTM E 28) of at least 70° C., preferably in the range of from 75 to 125° C., more preferably 80 to 105° C. According to one embodiment, the tackifying resin is a fully hydrogenated hydrocarbon resin.

The tackifying resins, if present, can typically be present in an amount of up to 500 parts by weight per 100 parts by weight of block copolymer, depending on the desired end-use application. In general, the amount of tackifying resin, if present, will be in the range from 10 to 200 parts by weight per 100 parts by weight of block copolymer Stabilisers such as antioxidants/UV stabilisers/radical scavengers including, but not limited to phenols, organometallic compounds, aromatic amines, aromatic phosphites and sulfur compounds can also be added to the curable polymeric composition. Preferred stabilisers can include phenolic antioxidants, thio compounds and tris(alkyl-phenyl)phosphites.

Examples of commercially available antioxidants/radical scavengers are pentaerythrityl-tetrakis(3,5-di-tert-butyl-4-hydroxy-hydrocinnamate) (IRGANOX 1010); octadecyl ester of 3,5-bis(1,1-di-methylethyl)-4-hydroxy benzene propanoic acid (IRGANOX 1076); 2,4-bis(n-octyl-thio)-6-(4-hydrox-y-3,5-di-tert-butylanilino)-1,3,5-triazine (IRGANOX 565); 2-tert-butyl-6-(3-tert-butyl-2'-hydroxy-5-methylbenzyl)-4-methylphenyl acrylate (SUMILIZER GM); tris(nonylphenyl)phosphite; tris(mixed mono- and di-phenyl)-phosphite; bis(2,4-di-tert-butylphenyl)-pentaerythritol diphosphite (ULTRANOX 626); distearyl pentaerythritol diphosphite (WESTON 618); styrenated diphenylamine (NAUGARD 445); N-1,3-dimethylbutyl-N'-phen-yl-par-aphenylenediamine (SUMILIZER 116 PPD); tris(2,4-di-tert-butylphenyl)phosphite (IRGAFOS 168); 4,4-butylidene-bis-(3-methyl-6-tert-butylphenol) (SUMILIZER BBMS) (IRGANOX, SUMILIZER, ULTRANOX, WESTON, NAUGARD and IRGAFOS are trademarks).

The stabiliser(s) is(are) can be present in the curable polymeric composition in a total amount from 0.01 to 5% by weight, basis the total curable polymeric composition, preferably 0.2 to 3% by weight.

Other well-known components that can be present include anti-ozonants, colorants, fillers, reinforcing agents and end block resins.

If a photo-initiator is present, the curable polymeric composition can be cured by actinic radiation. Actinic radiation can include, but is not limited to daylight or an artificial actinic radiation source. Usually, the photo-initiator used is most sensitive in the ultraviolet (UV) range. Therefore, preferably, the artificial radiation source can furnish an effective amount of UV radiation. Particularly suitable UV sources are FUSION bulb lamps having output maxima at 260-270 nm, 320 nm and 360 nm ("H" bulb), at 350-390 nm ("D" bulb) or at 400-430 nm ("V" bulb) (FUSION is a trademark). Combinations of these FUSION bulb lamps can also be used. H and D bulb lamps are particularly useful, while a combination of D bulb and H bulb can also be suitably applied. Another example of a suitable source of UV radiation is a mercury-vapor lamp such as a 300 W/inch (300 W/2.5 cm) UV mercury medium pressure lamp from American UV Company. It will be appreciated that the output spectrum of any UV source has to substantially match the absorption spectrum of the photo-initiator.

End Uses

In an exemplary embodiment, block copolymer (i) is combined with curable functional compound (I), a photo initiator, and a plasticizer to obtain a curable polymeric composition that is a gel for use in cable filling compositions. One example could be as a filling or protectant material for cables, including fiber optic cables. The resulting gel is a curable polymeric composition that exhibits beneficial properties of a thixotropic gel and a dry cable. At room temperature, curable functional compound (I) disclosed herein acts as a solvent for the polymer endblocks A and the curable polymeric composition loses its cohesion and becomes a liquid. Before curing, the curable polymeric composition is easy to pump, compound and/or apply. When the desired shape is formed, the curable polymeric composition can be cured to polymerize the curable functional compound (I). During and after curing, the curable functional compound (I) acts as reinforcing resin for the elastomeric composition or the block copolymer (i). After curing is complete the resulting curable polymeric composition becomes cohesive.

The curable polymeric composition can be cured with natural or artificial UV radiation (electron-beam is a also possible). The curable polymeric composition disclosed herein is fluid gel that is easily pumpable at room temperature (or below 60° C.) and can be crosslinked within the cable (for example, a thin UV transparent cable) to become cohesive. The curable polymeric composition can be crosslinked within the cable by exposing the curable polymeric composition to UV radiation to form a solid composition that is cohesive with within the cable. The curable polymeric composition which forms a cohesive oil gel is solid and will not flow within or from the cable when for instance, the cable is cut.

The polymer composition disclosed herein may also be used as a sealant or solvent free sealant. The curable polymeric composition can be used in many other end-use applications wherein fillers or sealants are required and/or there is a need for easier processing of the curable polymeric composition.

EXAMPLES

The following examples are provided to illustrate exemplary curable and cured polymeric compositions herein disclosed. The examples are not intended to limit the scope of the present disclosure and they should not be so interpreted.

Table 1 describes the composition and molecular structure of exemplary Polymers A and B used to form the exemplary curable polymeric compositions in Table 2.

TABLE 1

Exemplary Polymers A and B

| Name | Structure | PS Block Molecular Weight (Kg/mole) | Main peak app GPC (Kg/mole) | Diblock Content (%) | PS content (%) |
|---|---|---|---|---|---|
| Polymer A | (SEP)n | 3.5 | 620 | <5 | 6.8 |
| Polymer B | SEBS | 6.2 | 120 | <7 | 18.6 |

Table 2 describes the composition of exemplary curable Compositions 1-6 including Polymers A and B. The viscosity and softening points before and after curing of each exemplary curable composition is also listed in Table 2.

Polymers A and B were combined with a curable functional compound (I), a photoinitiator, a plasticizer and an antioxidant to form exemplary curable polymeric Compositions 1-6. The curable functional compound (I) used was hexanediol diacrylate (HDDA) having a solubility parameter of 9.14 $(cal/cm^3)^{1/2}$. Prior to curing, the exemplary curable polymeric Compositions 1-6 were liquid and exhibited Newtonian characteristics. The curable polymeric Compositions 1-6 disclosed in Table 2 were cured using UV radiation, with a dose of 2000 $mJ/cm^2$ (It is understood by those of skill in the art that curing time/UV exposure will depend on such things as sample thickness and reactivity). Cohesive and solid cured polymeric compositions were formed after curing the exemplary curable polymeric Composition 1-6.

TABLE 2

Exemplary Curable Polymeric Compositions

| Ingredient | Comp 1 | Comp 2 | Comp 3 | Comp 4 | Comp 5 | Comp 6 |
|---|---|---|---|---|---|---|
| Polymer A | 8 | 8 | 8 | | | |
| Polymer B | | | | 8 | 8 | 8 |
| Primol 352 oil | 89.1 | 86.6 | 81.6 | 89.1 | 86.6 | 81.6 |
| HDDA | 2.5 | 5 | 10 | 2.5 | 5 | 10 |
| Irgacure 651 photonitiator from BASF-Ciba | 0.3 | 0.3 | 0.3 | 0.3 | 0.3 | 0.3 |
| Irganox 1010 antioxidant from BASF-Ciba | 0.1 | 0.1 | 0.1 | 0.1 | 0.1 | 0.1 |
| Viscosity in Pa · s (shear rate 5 $sec^{-1}$) | | | | | | |
| 40° C. before cure | 9.8 | 25 | 102 | 200 | 43 | 800 |
| 40° C. after cure | Solid | Solid | | Solid | Solid | |
| 60° C. before cure | 2.9 | 8.2 | 26 | 2.2 | 0.8 | 2.4 |
| 60° C. after cure | solid | solid | | solid | solid | |
| Softening point, ° C. (R&B) before cure | <22 Liquid at RT | <22 Liquid at RT | <22 Liquid at RT | 40 | 27 | 44 |
| Softening point, ° C. (R&B) after cure | >160 | >160 | >160 | 50 | >160 | >160 |

For each exemplary curable polymeric Composition 1-6 an optimum range of reactive diluent content is used to achieve low viscosity at low temperatures and good cohesion after curing. It was discovered that high amounts of reactive diluent causes the viscosity of the exemplary curable polymeric Compositions 1-6 to increase.

For Polymer A, 2.5% of HDDA content in the total curable polymeric composition (450% of the PS phase) provides the appropriate flow at low temperature and cohesion after curing. The softening point is above 160° C. after curing for each exemplary curable polymeric Composition 1-3 utilizing Polymer A.

For Polymer B, 5% HDDA content in the total curable polymeric composition (312% of the PS phase) provides the appropriate flow at low temperature and cohesion after curing. Without HDDA, the softening point is about 48° C. after curing. When sufficient reactive diluent was used, softening points were above 160° C. after curing.

Comparative Example 1

Table 3 describes the composition and molecular structure of comparative Polymer C used to form the comparative polymeric Composition 7 disclosed in Table 4.

TABLE 3

Comparative Polymer C

| Name | Structure | PS Block Molecular Weight (Kg/mole) | Main peak app GPC (Kg/mole) | Diblock Content (%) | PS content (%) |
|---|---|---|---|---|---|
| Polymer C | SEBS | 10.1 | 109 | <1 | 30 |

Table 4 illustrates the amount by weight percentage of each ingredient used to form the comparative polymeric Composition 7 of Comparative Example 1.

TABLE 4

Comparative Polymeric Composition 7

| Component | Weight Percentage |
|---|---|
| Polymer C | 8% |
| white oil | 89.1% |
| hexanediol diacrylate | 2.5% |
| Irgacure 651 Photo initiator | 0.3% |
| Irganox 1010 Antioxidant | 0.1% |

Polymer C was combined with a curable functional compound (I), a photoinitiator, a plasticizer and an antioxidant. The curable functional compound (I) used was hexanediol diacrylate (HDDA) having a solubility parameter of 9.14 $(cal/cm^3)^{1/2}$. Prior to curing, the comparative polymeric Composition 7 was not a liquid. Therefore, comparative polymeric Composition 7 is not capable of use in the applications disclosed herein. The deficiencies in curing are attributed in part to the large PS block size in Polymer C.

Comparative Example 2

Table 5 describes the composition and molecular structure of comparative Polymer D used to form the comparative polymeric Composition 8 disclosed in Table 6.

TABLE 7

Comparative Polymer D

| Name | Structure | PS Block Molecular Weight (Kg/mole) | Main peak app GPC (Kg/mole) | Diblock Content (%) | PS content (%) |
|---|---|---|---|---|---|
| Polymer D | SEP | 35.5 | 147 | 100 | 36.6 |

Table 6 illustrates the amount by weight percentage of each ingredient used to form the comparative polymeric Composition 8 of Comparative Example 2.

TABLE 6

| Comparative Polymeric Composition 8 | |
| --- | --- |
| Component | Weight Percentage |
| Polymer D | 8% |
| white oil | 89.1% |
| hexanediol diacrylate | 2.5% |
| Irgacure 651 Photo initiator | 0.3% |
| Irganox 1010 Antioxidant | 0.1% |

Comparative Polymer D was combined with a curable functional compound (I), a photoinitiator, a plasticizer and an antioxidant. The curable functional compound (I) used was hexanediol diacrylate (HDDA) having a solubility parameter of 9.14 $(cal/cm^3)^{1/2}$. Prior to curing, the comparative polymeric Composition 8 was a liquid. Comparative polymeric Composition 8 was not a solid or cohesive after it was exposed to UV radiation. Therefore, comparative polymeric Composition 8 is not capable of use in the applications disclosed herein. The poor cohesion is attributed in part to a 100% diblock content in Polymer D.

FIG. 1 illustrates the viscosity as a function of shear rate of exemplary curable polymeric Composition 1 and comparative polymeric Composition 8. Viscosity was measured with a Brookfield viscometer at room temperature at shear rates from 0 to 10 sec-1 for 10 minutes. Table 7 illustrates the parameters used when measuring viscosity.

TABLE 7

| Viscosity Test Parameters | | | | | |
| --- | --- | --- | --- | --- | --- |
| Shear rate | Spindle speed | Viscosity of Comp 8 prior to curing (Pa · s.) | Viscoity of Comp 1 prior to curing (Pa · s.) | Vicosity of Comp 8 after comparable exposure to UV (Pa · s) | Viscosity of Comp 1 after curing (Pa · s) |
| 0.28 sec-1 | 1% | 170 | 31 | | |
| 0.56 sec-1 | 2% | 98 | 31 | 425 (max) | solid |
| 1.12 sec-1 | 4% (max) | 68.5 | 30 | >>> | |

Comparative polymeric Composition 8 exhibited thixotropic behavior prior to curing. After exposure to UV radiation, Composition 8 still exhibited thixotropic behavior, but with higher viscosities. Composition 8 was not capable of being cured into a cohesive solid after exposure to UV radiation.

Exemplary curable polymeric Composition 1 exhibited Newtonian behavior prior to curing. The viscosity of exemplary curable polymeric Composition 1 was lower than the viscosity of comparative polymeric Composition 8 prior to exposure to UV radiation. After exposure to UV radiation Composition 1 cured into a cohesive solid.

Example embodiments have been described hereinabove curable and cured polymeric compositions. Various modifications to and departures from the disclosed example embodiments will occur to those having ordinary skill in the art. The subject matter that is intended to be within the spirit of this disclosure is set forth in the following claims.

What is claimed is:

1. A fiber optic cable comprising a curable polymeric composition, the curable polymeric composition comprising:
   (i) a thermoplastic block copolymer containing at least two polymer blocks A separated by at least one polymer block B, wherein each polymer block A is primarily a poly(monovinyl aromatic hydrocarbon) block, and polymer block B is a hydrocarbon polymer block comprising a hydrogenated conjugated diene wherein prior to hydrogenation the block B is comprised of at least 90% by weight of the conjugated diene,
   or the polymer block B is a controlled distribution copolymer block comprising conjugated diene and monovinyl aromatic hydrocarbon wherein (1) terminal regions adjacent to each A block are rich in conjugated diene units and (2) one or more regions not adjacent to the A blocks are rich in monovinyl aromatic units, wherein at least 90% of the conjugated dienes are hydrogenated;
   (ii) a curable functional compound compatible with polymer block A; and
   (iii) optionally an initiator,
   wherein the at least two polymer blocks A have a true molecular weight of 9,000 or less,
   and wherein compatibility of the curable compound with polymer block A is defined as a function of a solubility parameter of the curable compound in a range of 8.72 to 12 $(cal/cm^3)^{1/2}$.

2. The curable polymeric composition of claim 1, wherein the curable functional compound is an aliphatic polyol acrylate or methacrylate.

3. The curable polymeric composition of claim 1 further comprising 50% or more by weight of a plasticizer.

4. The curable polymeric composition of claim 1 wherein the initiator is a photo-initiator.

5. The curable polymeric composition of claim 1 wherein the block copolymer has the structure A-B-A or (A-B)nX, wherein X is the residue of a coupling agent, n is greater than or equal to 2.

6. A cable comprising a filling material, said filling material comprising a polymer composition comprising:
   (i) a thermoplastic block copolymer containing at least two polymer blocks A separated by at least one polymer block B, wherein each polymer block A is primarily a poly(monovinyl aromatic hydrocarbon) block, and polymer block B is a hydrocarbon polymer block comprising a hydrogenated conjugated diene wherein prior to hydrogenation the block B is comprised of at least 90% by weight of the conjugated diene,
   or the polymer block B is a controlled distribution copolymer block comprising conjugated diene and monovinyl aromatic hydrocarbon wherein (1) terminal regions adjacent to each A block are rich in conjugated diene units and (2) one or more regions not adjacent to the A blocks are rich in monovinyl aromatic units, wherein at least 90% of the conjugated dienes are hydrogenated;
   (ii) a curable functional compatible with polymer block A,
   (iii) a paraffinic or naphthenic extending oil, and
   (iii) optionally an initiator,
   wherein the at least two polymer blocks A have a true molecular weight of 9,000 or less,
   and wherein compatibility of the curable compound with polymer block A is defined as a function of a solubility parameter of the curable compound in a range of 8.72 to 12 $(cal/cm^3)^{1/22}$.

7. The cable of claim 6, wherein the cable comprises optical fibers.

8. The cable of claim 6, wherein said polymeric composition has been cured.

9. The cable of claim 6, wherein the curable functional compound is an aliphatic polyol acrylate or methacrylate.

10. A method of filling a fiber optic cable comprising:
pumping a filling material into a cable, said filling material comprising a polymeric composition comprising:
(i) a thermoplastic block copolymer containing at least two polymer blocks A separated by at least one polymer block B, wherein each polymer block A is primarily a poly(monovinyl aromatic hydrocarbon) block, and polymer block B is a hydrocarbon polymer block comprising a hydrogenated conjugated diene wherein prior to hydrogenation the block B is comprised of at least 90% by weight of the conjugated diene,
or the polymer block B is a controlled distribution copolymer block comprising conjugated diene and monovinyl aromatic hydrocarbon wherein (1) terminal regions adjacent to each A block are rich in conjugated diene units and (2) one or more regions not adjacent to the A blocks are rich in monovinyl aromatic units, wherein at least 90% of the conjugated dienes are hydrogenated;
(ii) a curable functional compound compatible with polymer block A,
(iii) a paraffinic or naphthenic extending oil, and
(iii) optionally an initiator,
and curing said polymeric composition,
wherein the at least two polymer blocks A have a true molecular weight of 9,000 or less, and wherein compatibility of the curable compound with polymer block A is defined as a function of a solubility parameter of the curable compound in a range of 8.72 to 12 $(cal/cm^3)^{1/2}$.

11. The method of claim 10, wherein the curable functional compound is an aliphatic polyol acrylate or methacrylate.

12. The method of claim 10, wherein the cable comprises one or more optical fibers.

13. The curable polymeric composition of claim 6 further comprising 50% or more by weight of a plasticizer.

14. The curable polymeric composition of claim 6 wherein the initiator is a photo-initiator.

15. The curable polymeric composition of claim 1 wherein the block copolymer has the structure A-B-A or (A-B)nX, wherein X is the residue of a coupling agent, n is greater than or equal to 2.

* * * * *